United States Patent [19]

Coquillart et al.

[11] Patent Number: 4,559,681
[45] Date of Patent: Dec. 24, 1985

[54] AUTOMATIC MACHINE FOR HIGH EFFICIENCY MACHININGS, EMBODYING A CYCLICAL PROCESS OF COMBINED TRANSLATIONS AND MACHINING STEPS

[75] Inventors: Michel Coquillart, Saint.Etienne; Georges Yeretzian, Saint Chamond, both of France

[73] Assignee: Manufacture de Vilebrequins, France

[21] Appl. No.: 516,981

[22] Filed: Jul. 25, 1983

[30] Foreign Application Priority Data

Jul. 27, 1982 [FR] France ................ 82 13442

[51] Int. Cl.⁴ .............. B23B 35/00; B23B 39/24
[52] U.S. Cl. .................. 29/26 A; 29/564.7; 408/1 R; 408/3; 408/44; 408/53; 409/132
[58] Field of Search ............ 29/26 A, 564.7, 33 P, 29/563, 564, 565; 408/43, 46, 53, 13, 1, 3, 4, 44, 45; 409/131, 132

[56] References Cited

U.S. PATENT DOCUMENTS 2,842,985 7/1958 Grover .................. 29/38 C X
2,953,069 9/1960 Smith .................. 29/38 C X

*Primary Examiner*—Z. R. Bilinsky
*Attorney, Agent, or Firm*—Eric P. Schellin

[57] ABSTRACT

A method of, and apparatus for automatically machining work pieces, wherein a plurality of single spindle units are fixedly attached to a support, and the work pieces are maneuvered in front of the work units by a translatable table. The number of single spindle work units is determined by the formula 2N−1, wherein N is the number of machining operations to be performed on each work piece. As such, there is an odd number of work units thereby creating a central unit which carrys out the last machining operation to be performed in the work piece. The axes of the work units are precisely equally spaced from one another, and this spacing equals the spacing between the work pieces. The apparatus is cyclically operated so that a plurality of work pieces can be worked on simultaneously by individual work units and a new work piece can be loaded when the machining operation is completed on a previously loaded work piece.

9 Claims, 13 Drawing Figures

AUTOMATIC MACHINE FOR HIGH EFFICIENCY MACHININGS, EMBODYING A CYCLICAL PROCESS OF COMBINED TRANSLATIONS AND MACHINING STEPS

BACKGROUND OF THE INVENTION

1. Field of the Invention

The invention is directed to an automatic machine for high efficiency machinings, embodying a cyclical process of combined translations and machining steps.

The object of the invention pertains to the art unit of machine-tools, more particularly the special machines for carrying out from spindles various combined machinings.

2. Description of the Prior Art

On the one hand, special machines are known, which are designed and made for carrying out automatically in mass-production a succession of machining steps. These machines are of the transfer, multispindle type, they are relatively elaborate and expensive, and necessitate a substantial tooling which is specific in dependence on the workpieces to be machined. On the other hand, machining centers are also known, which are generally operated in monospindle operation and are capable of performing simultaneously one operation only. The next operation or step necessitates the change of the tool on the spindle. To solve the problems related to mass-production, it is necessary to provide either a transfer machine which is expensive and requires an overlong time for changing the specific toolings, or a plurality of machining centers having each one a productivity which is comparatively low. In either case the investments are quite substantial, and the production is limited by various restraints such as the impossibility to use means for a quick drilling on the machining multispindle units, the lack of flexibility and the periods of time which are necessary for changing over from a type of workpiece to be machined to a different type of workpiece.

In accordance with the invention, an automatic machine has been provided for high efficiency machinings in which the aforesaid disadvantages are eliminated, more particularly on account of the fact that the cost of this machine makes it possible to cut down the investments in a 4 to 1 ratio approximately, while obtaining a production and an efficiency which are similar.

SUMMARY

This automatic machine for high efficiency machinings in accordance with the invention is specifically characterized by the embodiment of a method in which:

fixed monospindle working units are mounted in alignment and are faultlessly interpositioned, with the same and most accurate spacing between the axes of the machining spindles;

to organize this mounting of the monospindle working units while taking into account the number and character of the machining steps to be carried out on the workpieces, the number of the monospindle working units to be put in operation is determined by the $2N-1$ ratio, wherein N is the number of machining steps to be performed on these workpieces, so that an uneven number of monospindle working units will be put in operation, and that there will be in any case a central unit on either side of which the same number of units is mounted;

the central unit is equipped so that the spindle thereof will carry out the last machining step No N; on a side of the central unit, and proceeding from this central unit, the units are equipped for carrying out the steps $N-1$, $N-2$; on the other side of the central unit, and proceeding from this central unit, the units are equipped for carrying out the steps $1, 2 \ldots$ up to $N-1$; in this manner, going through them in the same direction, it will be found that the shapes on either side of the central unit are identical;

a table or a plate is shifted in translation-transfer within the same plane and relative to the monospindle working units, said table or plate supporting as many positioning devices for the workpieces to be machined as there are machining steps to be performed on these workpieces, the positioning axes of the workpieces being separated by the same accurate and substantially equal spacings corresponding to the distances between centres of the spindles of the monospindle working units;

the workpiece or workpieces to be machined are shifted in translation in front of the monospindle working units, in an automatic manner and in accordance with a pre-established sequential order, in synchronized connection with the successive controls of the working units;

a handling system of the workpieces to be machined is embodied, in which each one of the workpieces is placed in succession upon one of the positioning devices, and is withdrawn on completion of the machining process, the handling system being for this purpose substantially operational within the area of the central unit by means of which the last machining step will always be performed.

In carrying out this method, the automatic machining apparatus is characterized in that the machine includes a fixed bench or equivalent support means on which the monospindle working units are mounted fixedly, the axes between the spindles being separated by substantially accurate and identical spacings, the number of the working units being uneven and equal to two times the number of the machining steps to be carried out minus one, taking into account that there is a central unit being the only one which is performing the last machining step, the unit or units on either side of the central unit being intended for carrying out in an alternate manner the other operational steps for machining the work piece; said machine including moreover, in combination, a table or plate mounted and provided with means for being movable in translation according to a sequential order which is pre-established relative to the monospindle working units, positioning devices or means for the workpieces to be machined, the number of which corresponds to the number of operational steps to be performed on the workpieces, the spacings between the axes of said positioning devices being accurate and equal between one another, and also equal to the spacings between the axes of the spindles of the woring units, handling means for positioning in succession the workpieces to be machined and for taking them out in succession on completion of the machining thereof, the handling means being for this purpose substantially operational within the area of the central unit by means of which the last machining step is performed.

These and other characteristics will be apparent from the following description.

BRIEF DESCRIPTION OF THE DRAWINGS

The invention will be understood more fully, without however being restricted thereby, with reference to the accompanying drawings, in which.

DETAILED DESCRIPTION

Figure 1:
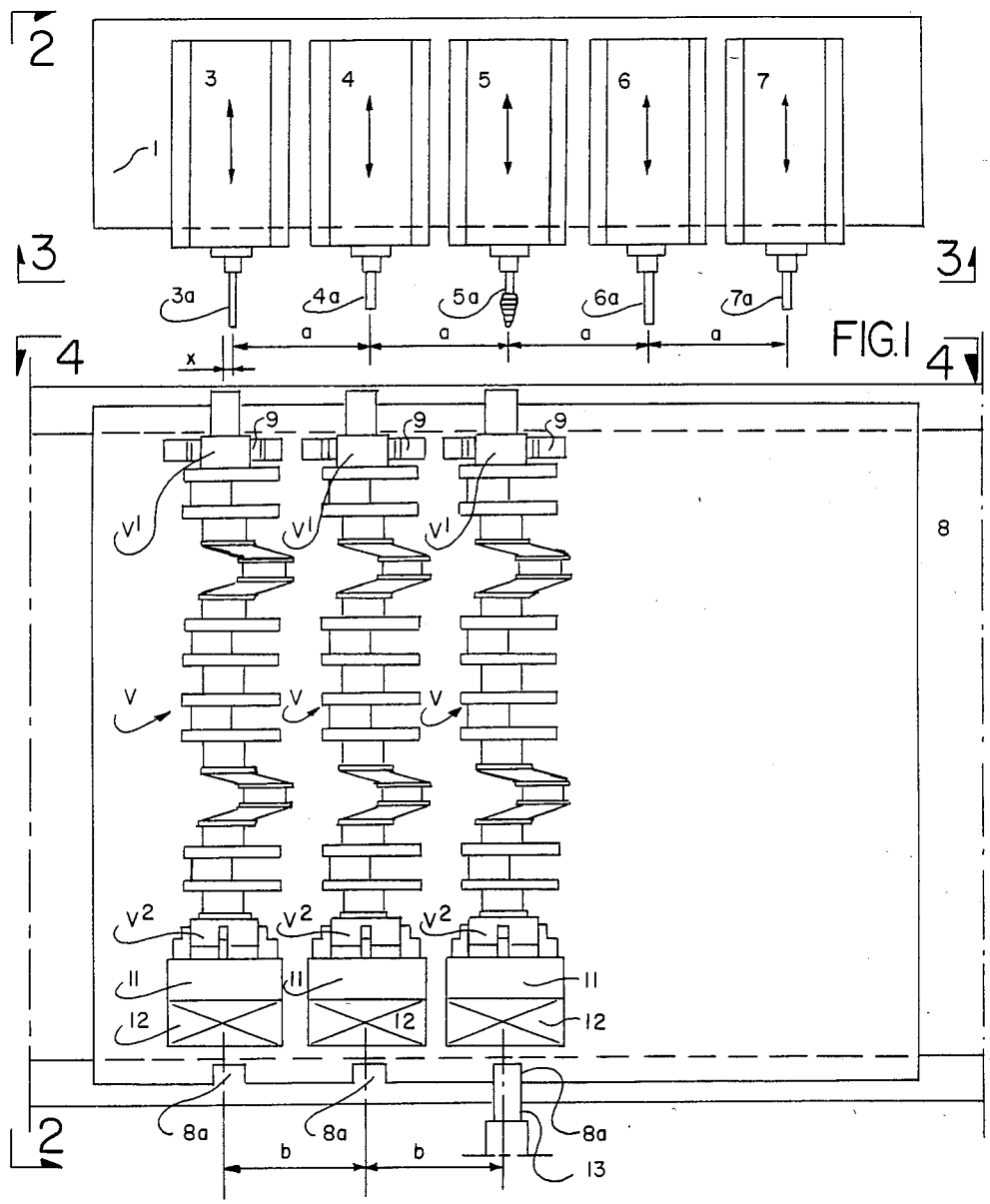
FIG. 1 is a plan view of schematic character, illustrating the automatic machine in accordance with the invention, used in this case for the machining of crankshaft end faces.

To make the object of the invention more concrete, the invention will be described now in a non restrictive form of embodiment as illustrated in the Figures of the drawings.

The machine in accordance with the invention includes substantially a fixed bench (1) or equivalent support means, supported by a framework (2) on which the monospindle working units (3, 4, 5, 6, 7) are mounted in alignment and in a fixed manner, the axes between the spindles being separated by same spacings (a) which are very accurate.

The monospindle units are generally of uneven number. In the non restrictive example which is illustrated, there are five units for carrying out 3 operational steps, however it will be obvious that this number may be different, 3, 7, 9 . . . in accordance with the requirements.

The central unit (5) is equipped for carrying out the third and last operational step on the workpieces, while the lateral units (3, 4) and (6, 7) are equipped for carrying out in an alternate manner the other operational steps for the machining of the workpiece.

In the example shown in the drawings, the machine is designed for performing drillings, tappings, chamberings, bevellings or borings on the end face of a crankshaft.

Figures 6, 7:
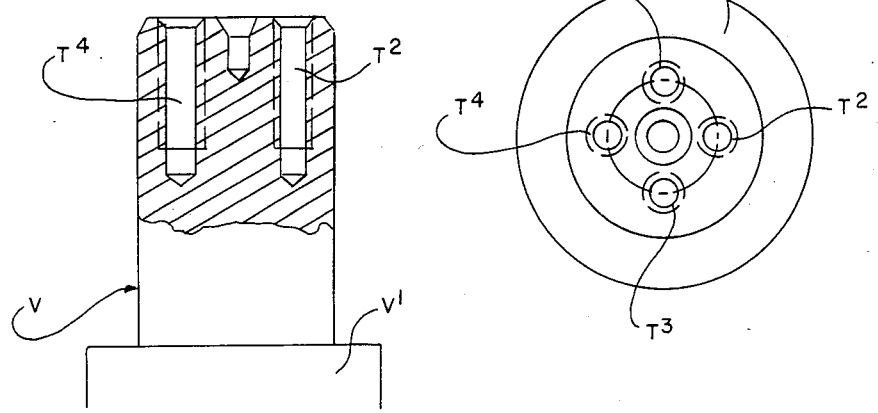
FIG. 6 is a sectional view in part, on a larger scale, showing an example of operational steps performed on an end of the crankshaft, with the machine in accordance with the invention.
FIG. 7 is a plan view corresponding to FIG. 6.

In the case which is illustrated, this machining is comprised of four hole, tapped with an equal spacing (T1, T2, T3, T4), to be made at the end of the crankshaft (V), as illustrated in FIGS. 6 and 7.

In this case, the central unit (5) is equipped with a tap (5a) in order to perform the last operational step (tapping) while the lateral units (3 and 6) are equipped with a drilling bit (3a and 6a), and the lateral units (4 and 7) are equipped with a chambering, bevelling or boring tool (4a and 7a).

In front of the monospindle units, and according to a pre-determined plane, the crankshafts (V) or other workpieces to be machined, are positioned on a table or plate (8) which is mounted and equipped with the aid of any well-known means, to be movable in reciprocating translations, according to an axis which is normal to the shifting direction of the spindles.

The plate (8) must be sized in the width so that, in the example illustrated, this plate will be capable of receiving three crankshafts which are interspaced for an accurate spacing (b) which is equal to the spacing (a) between the spindles, and said plate must be sized in the length so that it will be capable of accommodating crankshafts of substantial length.

Figure 4:
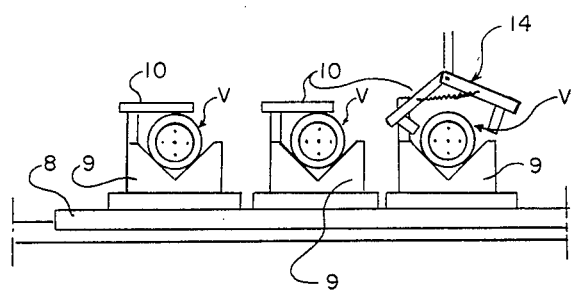
FIG. 4 is a view along line 4—4 in FIG. 1, showing the positioning devices for the workpieces of revolution and an example of handling means for the workpieces.
Figure 5:
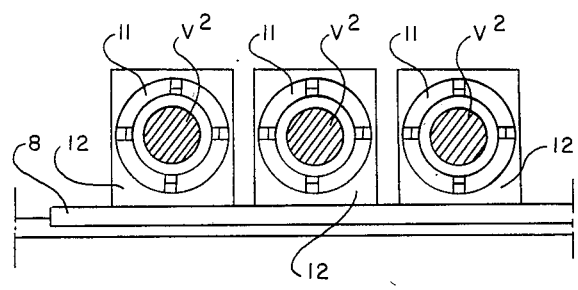
FIG. 5 is a view along line 5—5 in FIG. 1, showing the means for fastening and driving the workpieces for rotation.

On the side of the end to be machined, the crankshafts are positioned in abutment by a bearing assembly (V1), within V-shaped supports (9) or half-rings, and are maintained by any pneumatic or hydraulic clamping means such as the hinged flanges (10) illustrated in FIG. 4. In order to prevent the supports from wearing off, an alleviating system by oil film or any other film may be provided during the rotation of the workpieces.

On the side opposite, the crankshafts are mounted by means of their plate (V2) within a suitable centering and clamping device, of the type of a chuck (11) for instance.

To perform the operational steps of drilling, chambering and tapping on the four holes, it is necessary to provide rotations in succession of the crankshafts. For this purpose, the chucks (11) are associated with a three-outlet indexing plate or with indexing plates (12) to permit a 360°0 rotation, the indexing devices being actuated periodically in accordance with the predetermined cycle. The initial angular positioning, as the case may be, is provided by any well-known means such as collapsible auto-centering jaws.

Figure 2:
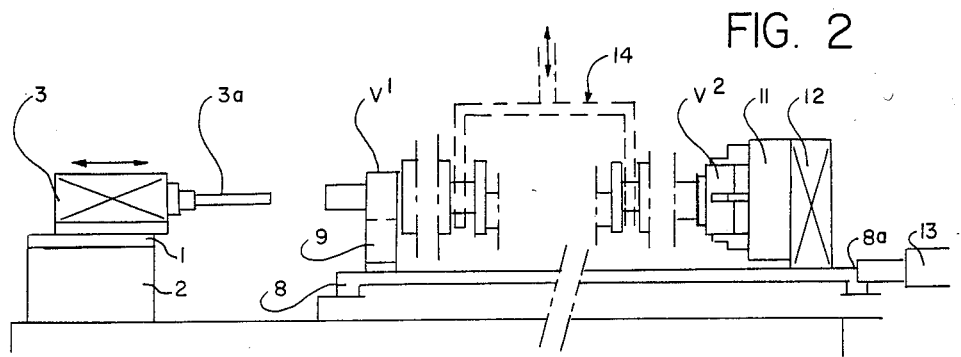
FIG. 2 is a front view along the line 2—2 in FIG. 1.
Figure 3:
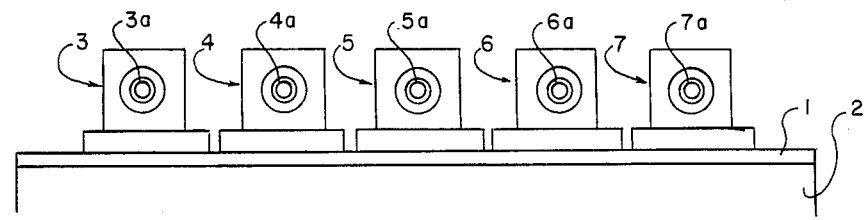
FIG. 3 is a view along line 3—3 in FIG. 1, showing the monospindle units.

The plate (8), which is movable in reciprocating translations, must also be indexed securely onto the positions corresponding to a machining (three positions in the example illustrated). For this purpose, there is provided for instance a finger (13) actuated by any desired means to pass from a rearward or collapsed position according to which the plate is free, to a forward or indexing position of the plate through insertion of the finger into one of the corresponding notches (8a) of the plate (FIGS. 1 and 2).

There is provided moreover a loading and discharging means for the crankshafts when they are placed in front of the central unit (5). This means has been denoted by pincers (14) in FIGS. 2 and 4, however, it will be understood that any types of convenient transport and gripping organs may be adapted as desired.

In an important manner, it will be pointed out that the number of the monospindle working units is determined by a 2N−1 ratio, in which N is the number of the operational steps of the same type to be carried out on the workpieces. Therefore, an uneven number of working units is used, and there is in any case a central unit performing the last operational step, the same number of working units being disposed on either side of this central unit.

It will be moted moreover that the number of workpieces being machined is always equal to the number of the operational steps of the same type to be carried out.

It will be well understood that the shiftings in reciprocating translations of the plate (8), as well as the control of the positions, can be monitored by a digital control, in order to be able to adjust an original offsetting corresponding to the drilling radius and the various strokes in accordance with the working radius. The angular indexing of the workpieces for the machining in a hole by hole manner is also effected by digital control of the indexing plate or plates (12).

Likewise, it is also possible to use a digital control of each monospindle working unit, for providing correct working cycles and speeds in the operation of the tools.

As an alternative form of embodiment, the machine may be designed with a fictitious central unit. In this case, the position of the workpiece in front of this location serves for loading and discharging only, and the number of units is equal to two times the number of operational steps to be performed.

The operational cycle of the machine in accordance with the invention will be described now with reference to FIGS. 8 to 13, in one application, and as an example only, concerning the machining on a crankshaft end face, said machining including drillings, chamberings and tappings of four holes with equal spacing, by means of the five monospindle units (3, 4, 5, 6 and 7) of the plate (8) with three positions or stations which will be called (A, B, C) hereinafter.

Figure 8:
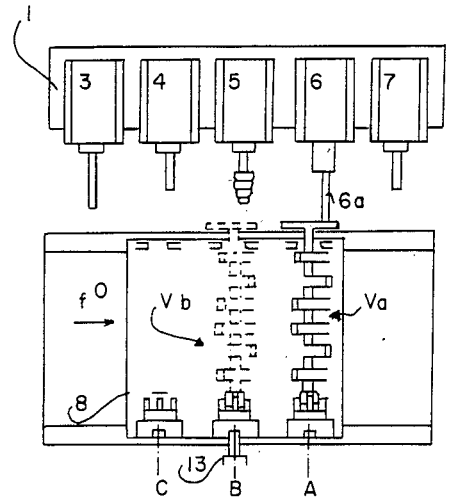
FIGS. 8 to 13 are very schematic plan views illustrating a part of the working cycle of the machine in accordance with the foregoing Figures.

The plate (8) is brought forward and indexed in the position wherein the station (A) is situated in front of the central unit (5), with an offsetting, (x) which corresponds to the drilling radius of the holes. A first crankshaft (Va) is positioned at the station (A) and wedged in angularly (FIG. 8). The plate (8) is moved in the direction of the arrow (Fo) so that the station (A) will be in front of the unit (6), with the offsetting (x). The unit (6) is actuated to perform, on a first hole, the drilling operation prior to the bevelling and tapping. After the backward motion of the spindle, the crankshaft is moved rotatably for 90 degrees by the indexing device (12), and the second hole is drilled. The same procedure is repeated for the two remaining holes. On completion of the drilling, a second crankshaft (Vb) is positioned at the station (B) of the plate (broken lines, FIG. 8), and the plate (8) is moved in the direction of the arrow (F1) to be brought forward and indexed in the position (with offsetting x) where the station (A) is in front of the unit (7) and the station (B) is in front of the unit (6).

Figure 9:
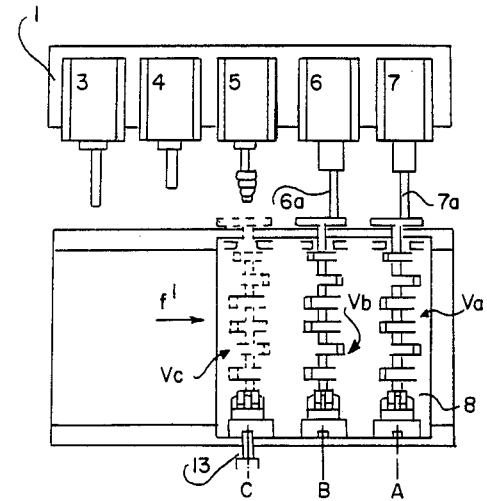
Figure 10:
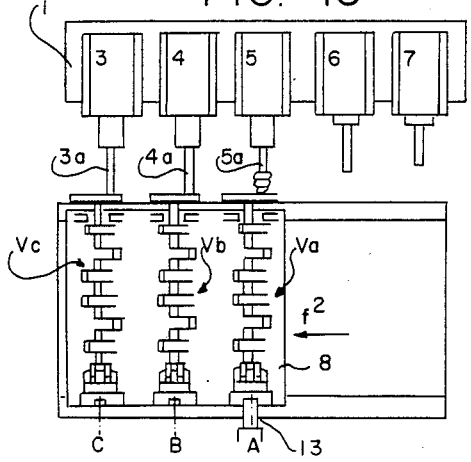
Figure 11:
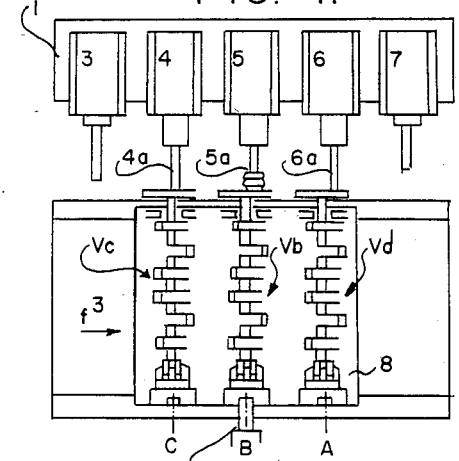

In this position, illustrated in FIG. 9, the units (6 and 7) are actuated to perform simultaneously the drillings on the crankshaft (Vb) and the entrance chamberings on the crankshaft (Va).

On completion of the operational step, a third crankshaft (Vc) is positioned at the station (C), then the plate (8) is moved in the direction of the arrow (F2) to be brought forward and indexed in the position (with offsetting x) where the stations (A, B, C) are respectively in front of the units (5, 4 and 3). In this position illustrated in FIG. 10, the drillings on the crankshaft (Vc), the entrance chamberings on the crankshaft (Vb) and the tappings on the crankshaft (Va) are performed simultaneously.

On completion of the operational step, the crankshaft (Va) which is completed is removed by the discharging device, and a fourth crankshaft (Vd) is positioned at the station (A).

The plate (8) is then moved to be brought back and indexed in the initial position, arrow (F3), in which the stations (A, B and C) are respectively in front (with offsetting x) of the units (6, 5 and 4). In this position (FIG. 11), the drillings on the crankshaft (Vd), the tappings on the crankshaft (Vb) and the chamberings on the crankshaft (Vc) are performed simultaneously.

Figure 12:
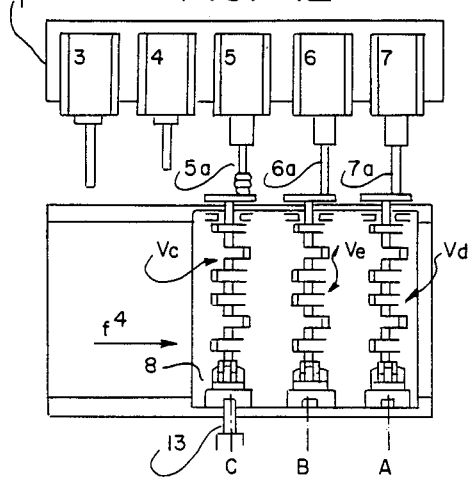
Figure 13:
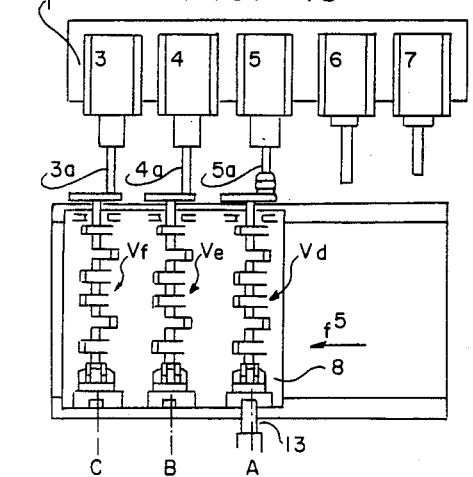

On completion of the operational step, the second crankshaft (Vb), also completed, is removed and replaced by a fifth crankshaft (Ve) and the plate (8) is moved in the direction of the arrow (F4), FIG. 12, in oder to be brought forward and indexed in the position according to which the tappings on the crankshaft (Vc), the drillings on the crankshaft (Ve) and the chamberings on the crankshaft (Vd) are performed simultaneously by the units (5), (6) and (7) respectively.

On completion of the operational step, the crankshaft (Vc) is removed and replaced by a sixth crankshaft, the crankshaft (Vf), then the plate is moved (according to arrow F5, FIG. 13) for carrying out simultaneously the drillings on (Vf), the chamberings on (Vc) and the tappings on (Vd). The operational cycle is continued further on, until all the workpieces are machined.

It will be noted moreover that the duration of the machining is varying in accordance with the units and the work thereof. The periods of time for each operation are based on the longest one.

The advantages will be clearly apparent from the description, and the following features will be more particularly pointed out:

the cost price of the machine is very substantially cut down as compared with the special multispindle machines and the machining centers (in a 4 to 1 ratio approximately, for the same efficiency);

the simplicity and the high efficiency of the means which are used, thanks to the use of quick drilling organs (impossible in the multispindle machines and in the machining centers), and to the fact that a plurality of worpieces are machined simultaneously (as many workpieces as operational steps), with substitution of a completed workpiece, always at the same station, by quick automatic handling;

the easiness in adapting the machine for different operations on various workpieces, without expensive specific tooling. It is merely necessary to change the tools, to interchange the positioning means for the workpieces, and to adjust the digital controls, and as the case may be the working cycles of the units;

the quality of the work, thanks to the use of the synchronized digital controls for the size and the positions of the machinings to be made, the order of the operational steps.

It will be noted moreover that the tapped holes can be made either according to a different radius, by modifying the dimension (x), or at different angles by modifying the angular adjustments of the indexing device; these modifications are given by the digital control.

The invention is not restricted in any way to the use nor to the form of embodiment of the various parts thereof which have been more particularly described, and any alternative form of embodiment remains within the scope of the invention.

We claim:

1. Automatic, heavy-duty machining machine characterized in that said machine comprises a support means (1) on which a plurality single-spindle work units (3, 4, 5, 6, 7) are permanently mounted each spindle is provided with an axis and the units are so mounted that the axes between the spindles are separated by very precise identical intervals (a), the number of work units is odd and equal to twice that of the machining operations to be performed less one, as such there is a central work unit (5) which is the only one to perform the last machining operations, the other adjoining units (3, 4, 6 and 7) on both sides of the central unit perform the other machining operations on the piece in an alternating manner, said machine also comprises a table means (8) mounted and equipped with means so as to be movable in translation in accordance with a sequential order predetermined in relation to the single-spindle work units, devices or means for positioning the pieces to be manufactured, whose number corresponds to the number of operations to be performed on the pieces and whose intervals (b) between the axes of these positioning devices are precise and equal to each other as well as to the intervals between the axes of the spindles of the work units, and holding means (14) for successively putting in place the pieces to be machined and for successively removing them after they have been machined, whereby the holding means operate to this end on pieces adjacent to the central unit (5), which performs the last machining operation.

2. Machine according to claim 1, characterized in that the sequential movements in alternating translation of the table means (8) and its indexation at each station are assured by a numeric command in such a manner as to be able to regulate a corresponding shift in some other operation.

3. Machine according to claim 1, characterized in that the indexations of the table means (8) at each work station are obtained by a retractable finger-type device (13) manipulated by any means so as to cooperate with notches provided in the table means or to avoid them.

4. Machine according to claim 2, characterized in that the spindles of the single-spindle units (3, 4, 5, 6, 7) are moved in alternating translations by a number command coupled to and synchronized with the numeric command of the table means (8) in accordance with the determined work cycle.

5. Machine according to claim 4, characterized in that when several operations are performed on each piece by the same work unit, the pieces are put in rotation by one or more drive dividers (12) with a numeric command coupled to and synchronized with the other numeric commands in accordance with the determined cycle.

6. Machine according to claim 5, further including braces having bearings and plates characterized in that these braces are abutted against the table means (8) via supports (9), a race on each brace bearing rollingly supported near the end piece to be machined, another brace mounted at the other end of the work, said brace being mounted by another plate, a chuck for supporting said place and an indexing divider connected to each chuck.

7. Machine according to claim 6, characterized in that the brace races (VI) placed in their support (9) are held by clamping means (10) articulated to the supports and moved in accordance with the determined cycle.

8. A cyclic method operating combined machining and translation operations, characterized in that precisely positioning a plurality of single-spindle fixed work units (3, 4, 5, 6 and 7) among themselves so that the axes of the machining spindles are aligned with very precise equal spacing (a) between the axes of the machining spindles;

selecting the number single-spindle work units, taking into account the number and the nature of the maching operations to be performed on the pieces, the number of single-spindle work units to be used is determined by the relation $2N-1$, in which N represents the number of machining operations to be performed on the pieces in such a manner that an odd number of single-spindle work units are used so that there is in any arrangement a central unit (5) on each side of which is mounted the same number of units;

equipping the central unit (5) in such a manner that its spindle performs the last machining operation N; equipping the units on one side of the central unit as they progress from it, to perform the operations $N-1, N-2 \ldots$; equipping the units on the other side of the control unit as they progress from it to perform the operations $1, 2 \ldots$ until $N-1$; in this manner the configurations of both sides of the central unit are found to be identical when passing through them in the same direction;

precisely positioning at least one piece on a table (8) to be machined as there are operations to be performed on these pieces so that the table can be moved in translation-transfer in the same plane and in relation to the single-spindle work units, whereby the axes for positioning the pieces are separated by precise and rigorously equal spaces (b) corresponding to the spaces between the axes (a) of the spindles of the single-spindle work units;

moving the piece or pieces to be machined in translation in front of the single-spindle work units in an automatic manner and according to a predetermined sequential order in synchronization with the successive commands of the work units;

holding the pieces to be machine by a system (14) which places each piece in succession on one of the positioning devices and withdraws it at the end of the machining, whereby this holding system acts essentially to this end in the zone of the central unit (5), which always performs the last machining operations.

9. Method according to claim 8, characterized by a machining according to a predetermined sequential order, according to which alternating translations of the table (8) and pieces positioned in relation to the work units (3,4,5,6,7) are combined in order that after a phase of placing pieces at all positioning locations on the table, as many different pieces are simultaneously machined as there are machining operations for a piece, whereby one piece is finished by the central unit (5) and another is put in place during each sequential movement starting with the Nth movement.

* * * * *